UNITED STATES PATENT OFFICE.

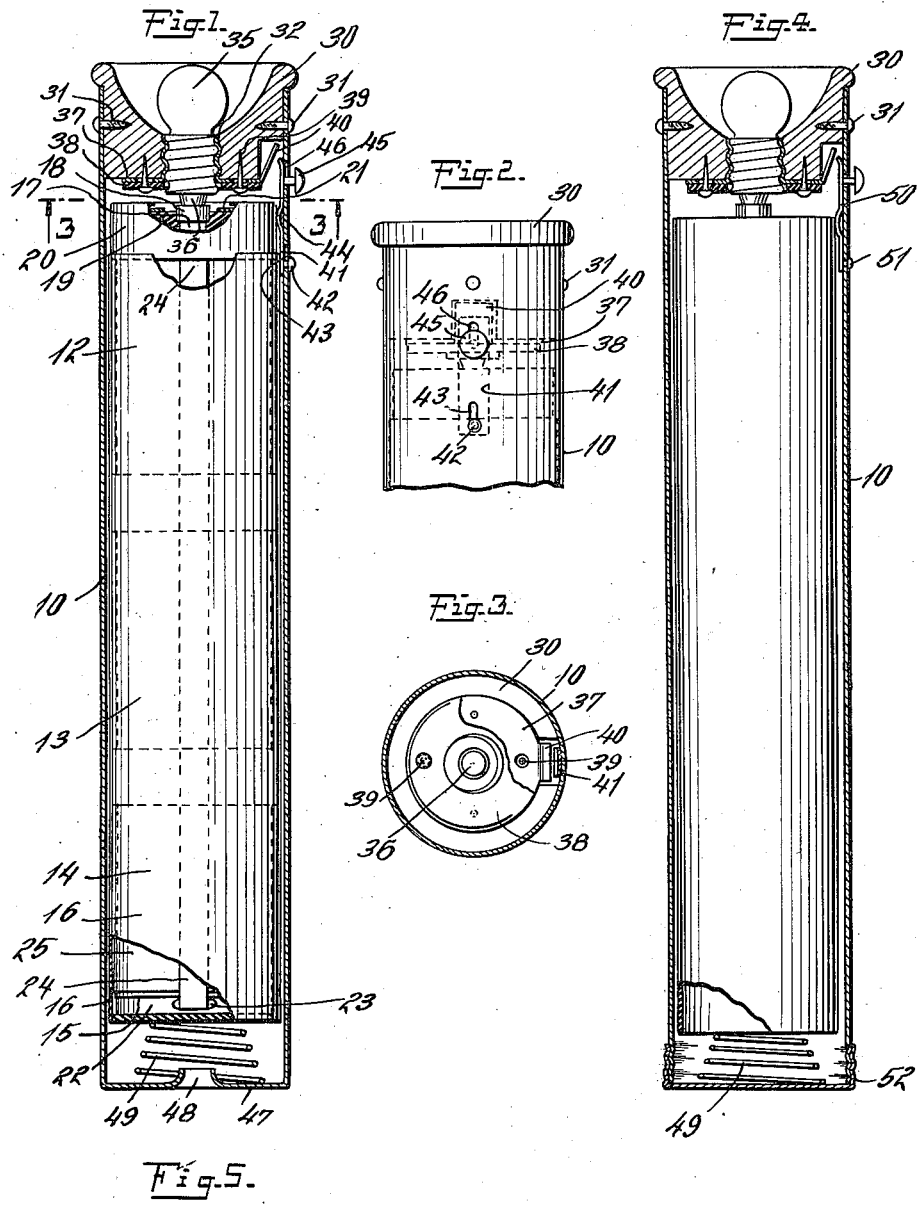

CHARLES F. BURGESS, OF MADISON, WISCONSIN, ASSIGNOR TO BURGESS BATTERY COMPANY, A CORPORATION OF WISCONSIN.

BATTERY HAND-LAMP.

1,297,657.

Specification of Letters Patent.

Patented Mar. 18, 1919.

Application filed May 26, 1917. Serial No. 171,110.

*To all whom it may concern:*

Be it known that I, CHARLES F. BURGESS, a citizen of the United States, residing at Madison, in the county of Dane, State of Wisconsin, have invented certain new and useful Improvements in Battery Hand-Lamps; and I do hereby declare the following to be a full, clear, and exact description of the invention, such as will enable others skilled in the art to which it appertains to make and use the same.

The present invention relates to battery hand lamps, and particularly to that type of lamp in which a tubular casing is provided for holding the battery, and a lamp and reflector are attached to one end of the casing.

It is an object of the present invention to produce a battery hand lamp in which the various parts of the device are few in number, are simple in form, are cheap to make and to assemble, and therefore of low cost. At the same time the structure of the present invention is strong and durable, is efficient and reliable, and possesses most of the advantageous features of the more expensive devices commonly on the market.

Other features and advantages of the invention will be made clear by a description of certain preferred embodiments thereof, as illustrated in the accompanying drawings, in which—

Figure 1 is a view principally in longitudinal section of one form of the invention;

Fig. 2 is an external view of the upper end of the device shown in Fig. 1;

Fig. 3 is a cross-section along the line 3—3 of Fig. 1;

Fig. 4 is a view principally in section of a modified form of the invention, and Fig. 5 is a view of a modified form of attachment for the lamp holding member of the device.

Referring to the drawings, in which similar reference characters denote similar parts throughout the several views, 10 represents a tubular casing which should preferably be made of metal, as brass or tin, but may also be made of other materials, as fiber or the like. The casing serves as a container for a battery which, in Fig. 1, is composed of a number of dry cells rigidly and electrically connected together in series to form a unitary structure. The battery shown herein is of the construction illustrated in my copending application, Serial No. 169,868 filed May 21, 1917, and may be briefly described as comprising three dry cells 12, 13, 14, connected end on end, as shown in my United States Patent No. 1,188,408, issued June 27, 1916, and each surrounded by a wrapper 15 of waxed paper or other suitable material. The carbon pole 17 of the upper cell 12 carries a metallic terminal cap 18 projecting above the usual pitch seal 19 at the end of the cell. The other terminal of the battery comprises a metallic cap 20 placed over the end of the upper cell 12 but insulated from the outer zinc pole thereof by suitable material 21, such as paper. Terminal cap 20 is connected to the outer zinc pole 22 of the lower cell 14 as at 23 by means of a conducting strip 24, laid along, but insulated from, the cells by a paper wrapping 25. About the rigid structure, so formed, is an outer paper wrapping 16, closed at the bottom with an insulating disk.

With the construction above described, the two terminals of the battery are at the top and adjacent to one another in convenient relation for ready attachment to a current consuming device which as here shown is an incandescent lamp.

At the upper end of casing 10 is a cap or plug 30 which may be constructed of wood or other inexpensive insulating material. This cap is formed with a concave depression serving as a reflector and to increase its effectiveness may be enameled or covered with a metallic paint. The cap may be fastened in place within the end of the casing by pins, such as small screws 31, or a bayonet or like joint may be provided, as shown in Fig. 5, if it is desired that the cap should be secured in a manner permitting easy detachment. The cap has a hole through its center to receive a threaded metallic socket 32, into which may be screwed the base of an incandescent lamp 35 of the type usually employed in devices of this character. The inner terminal 36 of the lamp is adapted to engage the inner terminal 18 of the battery. The bottom of socket 32 is connected to, or has formed integrally therewith, a metal plate 37, which is held in place upon the inner face of cap 30 by means of a ring 38 of insulating material and tacks 39 which pass through enlarged openings in plate 37, so that they are out of electrical contact therewith. At one side the plate 37 is provided with a yielding contact finger 40 which extends within a recess cut in one side of cap 30.

For the purpose of easily controlling the circuit of the lamp, a thumb switch is used. In Fig. 1, this switch comprises a spring finger 41 slidably mounted upon the inside of the casing by a rivet 42 which passes through a slot 43 in the casing. The spring finger is bent inwardly as at 44 to engage the outside of the terminal cap 20 of the battery. An actuating button 45, which passes through a slot 46 in the casing, is attached to the spring finger. If it be desired to cause intermittent lighting of the lamp, the spring finger, while occupying the position shown in Fig. 1, is depressed by button 45 until its free end engages contact finger 40, thus completing the lamp circuit to the terminal cap 20 of the battery. As soon as pressure is removed from the actuating button, the switch will open. If it be desired to cause the lamp to burn continuously, the switch is slipped along until its free end engages contact finger 40, in which position it will remain, with the lamp burning, until manually restored to its normal position.

The casing 10 of the embodiment illustrated in Fig. 1 is formed with an integral end 47 provided with an aperture 48 through which a rod or pencil may be inserted to push out the battery, if for any reason it becomes stuck in the casing and can not be slipped out for renewal. The wall of aperture 48 is preferably turned inwardly as shown in order to serve as a centering projection for a coiled spring 49 which holds the battery firmly in place with its inner terminal 18 against the inner terminal 36 of the lamp. The spring finger 41 of the switch, by its pressure at 44 on cap 20, also tends to prevent transverse displacement and shaking of the upper end of the battery if the latter does not fit snugly within the casing. The insulating ring 38 prevents any possibility of the battery becoming short-circuited when the lamp is removed. The structure is not subject to accidental lighting of the lamp when placed among metal tools in a tool box.

In the modification shown in Fig. 4 the battery is of the ordinary type, wherein the poles are at opposite ends. The casing 10 is in this case constructed of metal so that it may conduct the current from the spring 49 which is in contact with the lower or zinc terminal of the battery to the switch 50. This switch is of substantially the same construction as in Fig. 1, but is fixed to the casing at 51 and consequently not adapted to slide along the latter. In this embodiment of the invention the lower end of the casing is closed by a metallic cap 52 screwed upon the threaded end of the casing. So far as the cap 30 and its associated parts are concerned, they are similar to the corresponding parts of Fig. 1. The form of battery shown in Fig. 1 may also be used in the casing of Fig. 4, and the battery of Fig. 4 can be used in the casing of Fig. 1, when that casing is of metal.

Various changes in the details of construction and of materials of many of the parts of these devices may be made without departing from the principle of the present invention.

I claim:—

1. A battery hand lamp comprising in combination, a casing, a cylindrical battery of dry cells housed therein in series connection, said battery having permanently attached terminals adjacent to one another at the top of the battery, an insulating plug closing one end of the casing, a lamp socket therein, and switch mechanism for connecting one battery terminal to said socket when desired.

2. A hand lamp comprising, in combination, a tubular casing, a battery within said casing, a wooden support fitting within one end of the casing and provided with an outer reflecting surface, means for securing said support in place, a conducting member attached to said support and formed with a projecting and inclined spring contact finger, a lamp socket mounted in said support and connected to said member, a lamp in said socket having one terminal engaging a terminal of the battery, and means mounted on said casing and adapted to wipe along said contact finger for establishing a circuit between the other terminal of the battery and said conducting member.

3. A hand lamp comprising, in combination, a tubular casing, a battery within said casing, an insulating support mounted in one end of said casing and provided with a concave recess and a central aperture, a lamp socket within said aperture, a conducting member attached to said support and electrically connected to the lamp socket, an insulating member covering said conducting member, a lamp in said socket having a terminal in contact with one terminal of the battery, a spring finger slidably mounted on said casing and adapted to swing inwardly at its free end to establish a circuit between said conducting member and the other terminal of the battery.

4. A hand lamp comprising, in combination, a tubular casing, a battery within said casing comprising a plurality of dry cells and having an inner terminal and an outer terminal adjacent one another, an insulating support mounted in one end of the casing and provided with a concave recess and a central aperture, a lamp socket within the aperture, a conducting member associated with the socket, a lamp in the socket having its inner terminal in contact with the inner terminal of the battery and a switch mounted within the casing, and having a portion in engagement with the outer terminal of the battery and a free end adapted to be moved into engagement with the conducting member to establish the circuit of the lamp.

5. A hand lamp comprising, in combination, a tubular casing, a battery within said casing having a central terminal of one polarity and an outer adjacent terminal of opposite polarity, an insulating support mounted in one end of the casing and provided with a concave recess and a central aperture at the bottom of the recess, a lamp socket within the aperture, a conducting member electrically connected to the lamp socket and provided with a projecting spring contact finger, an insulating member over the conducting member, fastening devices passing through the insulating and conducting members, a lamp in the socket having a terminal in contact with the central terminal of the battery, and a switch finger mounted upon the inside of the casing and having a portion in engagement with the outer terminal of the battery and a free end adapted to be swung into engagement with the contact finger to establish the circuit of the lamp.

6. In a battery hand lamp, the combination of a metal casing having an integral bottom, a battery of dry cells arranged end to end within said casing, a plug of insulating material detachably secured to the front end of the casing, a lamp carried thereby, and switch mechanism on the inside of said casing, said mechanism having a push button whereby a part of said mechanism can be swung inward to control the flow of current through the lamp, said battery being removable through the top end of the casing without disturbance of said switch mechanism.

7. A hand lamp casing, comprising a metal tube with a permanent closure for one end, said closure having a hole through which a rod may be introduced to eject a worn out battery, the other end of said tube carrying a detachable wooden plug in which a lamp may be mounted.

In testimony whereof I affix my signature.

CHARLES F. BURGESS.